(12) United States Patent
Gonen et al.

(10) Patent No.: US 10,005,136 B2
(45) Date of Patent: Jun. 26, 2018

(54) DRILL OR DRILL HEAD WITH BURNISHING MARGIN

(71) Applicant: ISCAR, LTD., Tefen (IL)

(72) Inventors: Eitan Gonen, Kfar Vradim (IL); Anatoly Yanovski, Maalot (IL)

(73) Assignee: Iscar, Ltd., Tefen (IL)

( * ) Notice: Subject to any disclaimer, the term of this patent is extended or adjusted under 35 U.S.C. 154(b) by 142 days.

(21) Appl. No.: 15/127,094

(22) PCT Filed: Feb. 23, 2015

(86) PCT No.: PCT/IL2015/050201
§ 371 (c)(1),
(2) Date: Sep. 19, 2016

(87) PCT Pub. No.: WO2015/140781
PCT Pub. Date: Sep. 24, 2015

(65) Prior Publication Data
US 2018/0029140 A1    Feb. 1, 2018

Related U.S. Application Data

(60) Provisional application No. 62/054,150, filed on Sep. 23, 2014.

(51) Int. Cl.
B23B 51/02    (2006.01)

(52) U.S. Cl.
CPC .......... B23B 51/02 (2013.01); *B23B 2220/24* (2013.01); *B23B 2251/446* (2013.01); *Y10T 408/9097* (2015.01)

(58) Field of Classification Search
CPC ................ B23B 51/02; B23B 2220/24; B23B 2251/446; Y10T 408/9097
See application file for complete search history.

(56) References Cited

U.S. PATENT DOCUMENTS

| | | | |
|---|---|---|---|
| 2,778,252 A | 9/1956 | Oxford | |
| 5,078,554 A * | 1/1992 | Kubota | B23B 51/02 408/227 |
| 5,423,640 A * | 6/1995 | Lindblom | B23B 51/02 408/227 |
| 5,829,927 A | 11/1998 | Nakamura et al. | |
| 5,967,712 A | 10/1999 | Magill et al. | |

(Continued)

FOREIGN PATENT DOCUMENTS

| | | | |
|---|---|---|---|
| DE | 10144241 A1 * | 4/2003 | ............. B23B 51/02 |
| EP | 1475173 A1 | 11/2004 | |

(Continued)

OTHER PUBLICATIONS

International Search Report dated May 22, 2015, issued in PCT counterpart application (No. PCT/IL2015/050201).

(Continued)

*Primary Examiner* — Eric A Gates

(74) *Attorney, Agent, or Firm* — Womble Bond Dickinson (US) LLP

(57) ABSTRACT

A drill configured for drilling ductile materials includes a drill margin with a margin extremity adjacent to a relief surface. The drill includes a drill body and a drill head secured to the drill body via rotational coupling of the drill head on the drill body.

16 Claims, 3 Drawing Sheets

(56) References Cited

U.S. PATENT DOCUMENTS

| | | | |
|---|---|---|---|
| 6,371,702 B1* | 4/2002 | DeWald, Jr. | B23B 51/0009 408/227 |
| 6,923,602 B2* | 8/2005 | Osawa | B23B 51/02 408/230 |
| 7,011,478 B2* | 3/2006 | Stokey | B23B 51/0009 408/227 |
| 7,018,145 B2* | 3/2006 | Mast | B23B 51/0009 408/227 |
| 7,547,166 B2* | 6/2009 | Nuzzi | B23B 51/0009 408/227 |
| 7,789,599 B2* | 9/2010 | Takikawa | B23B 51/02 408/230 |
| 8,105,001 B2* | 1/2012 | Krenzer | B23B 51/02 408/227 |
| 8,419,322 B2 | 4/2013 | Hodza et al. | |
| 8,540,463 B2* | 9/2013 | Goulbourne | B23B 51/02 408/144 |
| 8,834,080 B2* | 9/2014 | Kauper | B23B 51/02 408/224 |
| 2005/0100419 A1 | 5/2005 | Stokey et al. | |
| 2005/0249562 A1 | 11/2005 | Frejd | |
| 2007/0227766 A1 | 10/2007 | Ito et al. | |
| 2011/0318128 A1* | 12/2011 | Schwagerl | B23B 51/02 408/200 |
| 2015/0266107 A1* | 9/2015 | Gonen | B23B 51/02 408/230 |

FOREIGN PATENT DOCUMENTS

| | | | |
|---|---|---|---|
| JP | 01045504 A | * | 2/1989 |
| JP | 02298408 A | * | 12/1990 |
| JP | 06015512 A | * | 1/1994 |
| JP | H 09-295212 A | | 11/1997 |
| JP | H 10-328918 A | | 12/1998 |
| JP | 2003-136317 A | | 5/2003 |
| JP | 2003275913 A | * | 9/2003 |
| WO | WO 2005061164 A1 * | 7/2005 | B23D 77/00 |

OTHER PUBLICATIONS

Written Opinion dated May 22, 2015, issued in PCT counterpart application (No. PCT/IL2015/050201).

* cited by examiner

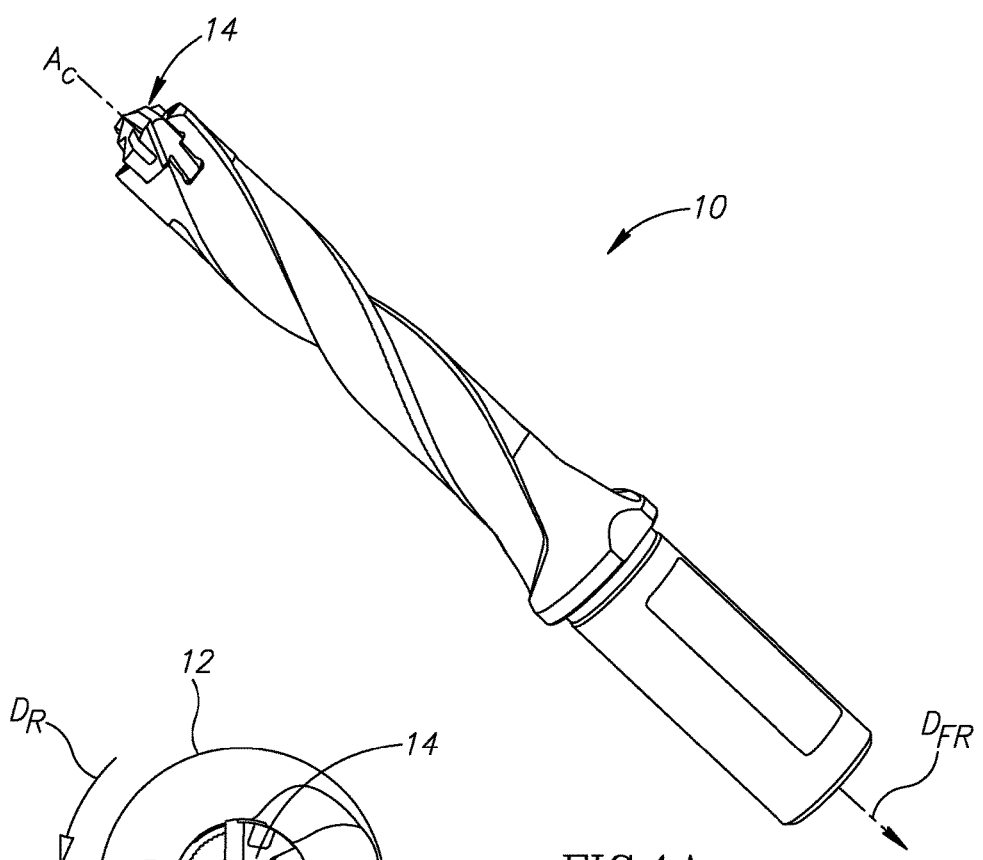
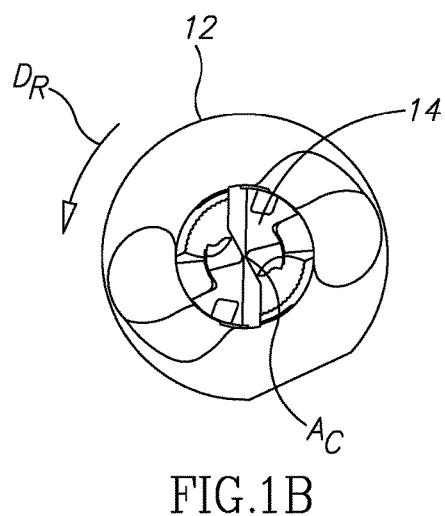
FIG.1A
FIG.1B

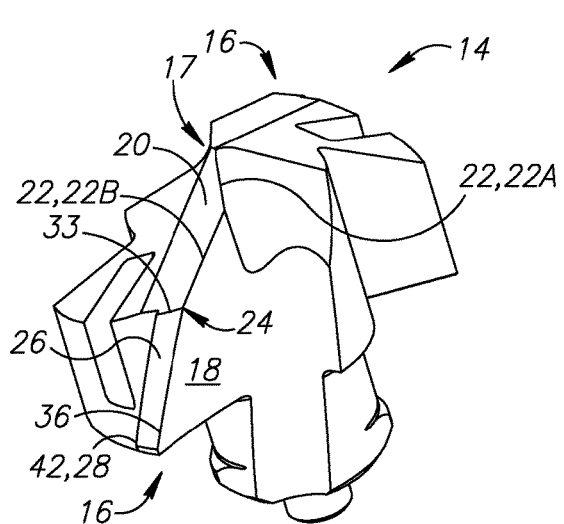
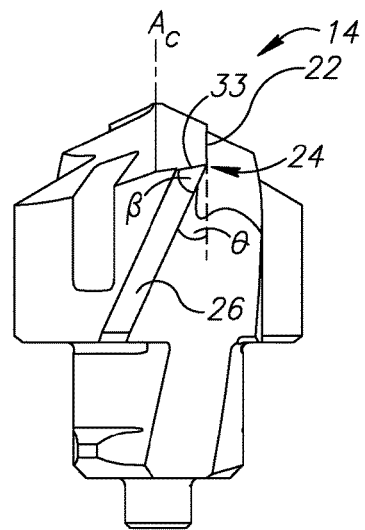
FIG.2A  FIG.2B
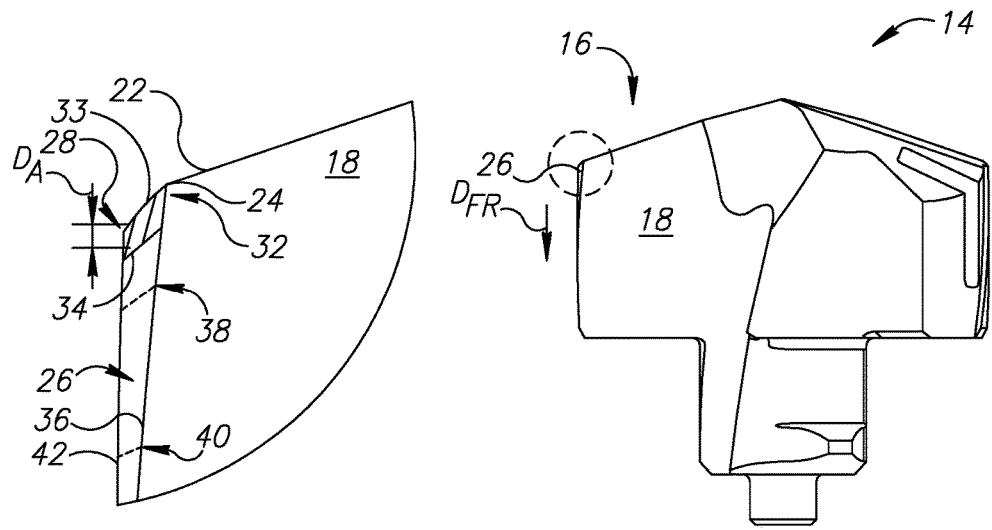
FIG.3  FIG.2C

DRILL OR DRILL HEAD WITH BURNISHING MARGIN

RELATED APPLICATIONS

This is a 371 US National Phase of International Patent Application No. PCT/IL2015/050201 filed Feb. 23, 2015, and published as WO 2015/140781A1 on Sep. 24, 2015, which claims priority to U.S. Ser. No. 62/054,150 filed Sep. 23, 2014 and U.S. Ser. No. 14/219,893 filed Mar. 19 2014. The contents of the aforementioned applications are incorporated by reference in their entirety.

FIELD OF THE INVENTION

The subject matter of the present application relates to drill margins, in particular drill margins of drills and drill heads configured for drilling ductile materials such as low carbon steel and alloy steel.

BACKGROUND OF THE INVENTION

One measurement of drilling quality is the finish provided to workpiece. Providing a high-quality finish on ductile materials, such as low carbon steel or alloy steel, can be particularly challenging, and improved finish is often a desired result.

U.S. Pat. No. 8,419,322 discloses tool for use in a preformed round hole. More precisely it discloses a cutting insert with a minor edge cutting flank adjoining a minor cutting edge against a direction of rotation, and comprising a support element arranged at a distance from the major cutting edge against a feed direction. The support element has a radius of revolution larger than a pitch circle radius of the cutting insert, during a drilling operation. The support element is mentioned as being able to provide both a supporting function and a smoothing function.

It is an object of the present application to provide a new and improved drill or drill head.

SUMMARY OF THE INVENTION

The subject matter of the present application is applicable to drills and drill heads configured for creating and/or deepening preformed holes. Notably, drills of the present application are configured for only axially machining (i.e. drilling) and are not configured for machining in a non-axial direction (e.g. shouldering, ramping). More specifically, drills according to the present application are configured only for drilling holes of diameter corresponding to a cutting diameter of the tool. Nonetheless, the term "drill" is inclusive of drills configured to rotate and static drills configured to be static while a work piece is rotated.

In accordance with a first aspect of the subject matter of the present application, there is provided a drill or drill head having a central axis $A_C$ defining a front-to-rear direction and comprising: a plurality of cutting portions; each cutting portion comprising: a rake surface; a relief surface; a cutting edge formed at an intersection of the rake and relief surfaces and extending rearwardly to a cutting edge extremity defining a cutting diameter of the drill; and a margin extending rearwardly from the relief surface and also extending from the rake surface; wherein each margin comprises a margin extremity adjacent to the relief surface and located outside of the cutting diameter.

The margin, and more particularly the margin extremity, has been found to provide a burnishing function, and test results received thus far have surprisingly found that longevity of a drill or drill head with such margin extremity is apparently increased over comparative tools.

It will be understood that a drill or drill head with the above geometry, prior to the present discovery, was expected to shatter upon compression in a hole being drilled. It was theorized and testing has surprisingly confirmed that at least when drilling low carbon steel or alloy steel (believed to be due to the ductility thereof) such geometry is not adversely affected.

In accordance with another aspect of the subject matter of the present application, there is provided a drill or drill head comprising a cutting portion; the cutting portion comprising a drill margin; the drill margin comprising a margin extremity adjacent to a relief surface and located outside of a cutting diameter.

It will be understood that the above is a summary, and that any of the aspects above may further comprise any of the features described hereinbelow. Specifically, the following features, either alone or in combination, may be applicable to any of the above aspects:

A. A drill or drill head can have a central axis $A_C$ defining a front-to-rear direction. A drill or drill head can by rotationally symmetric about the central axis $A_C$. Cutting edge extremities of a drill or drill head can be equally circumferentially spaced about the central axis $A_C$. Margins of a drill or drill head can be equally circumferentially spaced about the central axis $A_C$.

B. A drill or drill head can comprise a plurality of cutting portions.

C. A cutting portion can comprise a rake surface, a relief surface, and a cutting edge formed at an intersection of the rake and relief surfaces.

D. A cutting edge can extend rearwardly to a cutting edge extremity defining a cutting diameter of the drill or drill head. A cutting edge can be configured for drilling ductile materials such as low carbon steel and alloy steel. A cutting edge can have a rake angle θ, at a cutting edge extremity, of twenty to thirty degrees ($20° \leq \theta \leq 30°$).

E. A cutting portion can comprise a margin extending rearwardly from a relief surface and also extending from a rake surface.

F. A margin can comprise a margin extremity adjacent to a relief surface and located outside of the cutting diameter. Stated differently, a margin extremity is located further from a central axis $A_C$ than a cutting edge extremity. Stated differently yet, a margin extremity constitutes a furthermost point from the central axis $A_C$.

G. A margin can extend outside of a cutting diameter beginning from a cutting edge extremity. A margin can extend outside of the cutting diameter beginning from the cutting edge extremity, and continuously increase distance from the cutting diameter until a margin extremity. The continuous increase in distance can be at a decreasing rate (i.e. having a convexly-curved shape in a top view thereof).

H. A cutting portion can comprise a margin edge extending along an intersection of a margin and a rake surface. A margin, at each axial location along the margin edge, can comprise an extremity extending outside of a cutting diameter. A margin, at each axial location along the margin edge, can extend outside of the cutting diameter beginning from the margin edge. A margin, at each axial location along the margin edge, can continuously increase distance from the cutting diameter until an extremity. The continuous increase in distance can be at a decreasing rate (i.e. having a convexly-curved shape in a top view thereof).

I. A margin extremity can extend outside of a cutting diameter by a protrusion distance $D_P$ of at least one micron ($D_P \geq 0.001$ mm). For drills with a cutting diameter $D_C$ of eight to nineteen millimeters (8 mm $\leq D_C \leq 19$ mm), a preferred tested protrusion distance $D_P$ was two to eight microns (0.002 mm $\leq D_P \leq 0.008$ mm) outside of the cutting diameter $D_C$. For drills with a cutting diameter $D_C$ of twenty to twenty five millimeters (20 mm $\leq D_C \leq 25$ mm) a preferred tested protrusion distance $D_P$ was three to ten microns (0.003 mm $\leq D_P \leq 0.010$ mm) outside of the cutting diameter $D_C$. For drills with a cutting diameter $D_C$ of less than eight millimeters, a preferred protrusion distance $D_P$ may be one to six microns (0.001 mm $\leq D_P \leq 0.006$ mm). For drills with a cutting diameter $D_C$ greater than twenty five millimeters, a preferred protrusion distance $D_P$ may be four to twelve microns (0.004 mm $\leq D_P \leq 0.012$ mm). A preferred range of protrusion distances $D_P$ would be one to twelve microns (0.001 mm $\leq D_P \leq 0.012$ mm). A most preferred tested range of protrusion distances $D_P$ is two to ten microns (0.002 mm $\leq D_P \leq 0.010$ mm). Notwithstanding the above-said, it is also noted that a margin extremity extending outside of a cutting diameter by a protrusion distance $D_P$ of at least two microns ($D_P \geq 0.002$ mm) has found to have better performance than at least one micron ($D_P \geq 0.001$ mm). A margin, at each axial location, can comprise an extremity extending outside of the cutting diameter by a protrusion distance $D_P$ corresponding to the values above mentioned in connection with the margin extremity.

J. An entire margin can be located outside of the cutting diameter.

K. A margin can extend an axial distance no greater than 0.1 mm from a relief surface, preferably no greater than 0.01 mm from the relief surface.

L. A margin can comprise a margin portion. The margin portion can be the only portion of the margin comprising an extremity located outside of the cutting diameter. The margin portion can extend an axial distance no greater than 0.1 mm from a relief surface, preferably no greater than 0.01 mm from the relief surface.

M. Each cutting portion or margin of a drill or drill head (i.e. all cutting portions or all margins) can have one or more of the features detailed above.

N. A margin width $W_M$ measured from the cutting edge extremity 24 to the flank surface 42 can be between 5% to 10% of the cutting diameter $D_C$ (0.05 $D_C \leq W_M \leq 0.10$ $D_C$). With a range of 6% $\pm$ 1% having been successfully tested.

BRIEF DESCRIPTION OF THE DRAWINGS

For a better understanding of the subject matter of the present application, and to show how the same may be carried out in practice, reference will now be made to the accompanying drawings, in which:

FIG. 1A is a side view of a drill in accordance with an embodiment of the subject matter of the present application;

FIG. 1B is a front end view or top view of the drill in FIG. 1A;

FIG. 2A is a perspective side view of a drill head of the drill in FIGS. 1A and 1B;

FIG. 2B is a first side view of the drill head in FIG. 2A;

FIG. 2C is a second side view of the drill head in FIG. 2A, rotated 90° from the view shown in FIG. 2B;

FIG. 3 is an enlarged view of the encircled portion of the drill head in FIG. 2C;

DETAILED DESCRIPTION

Figure 4:
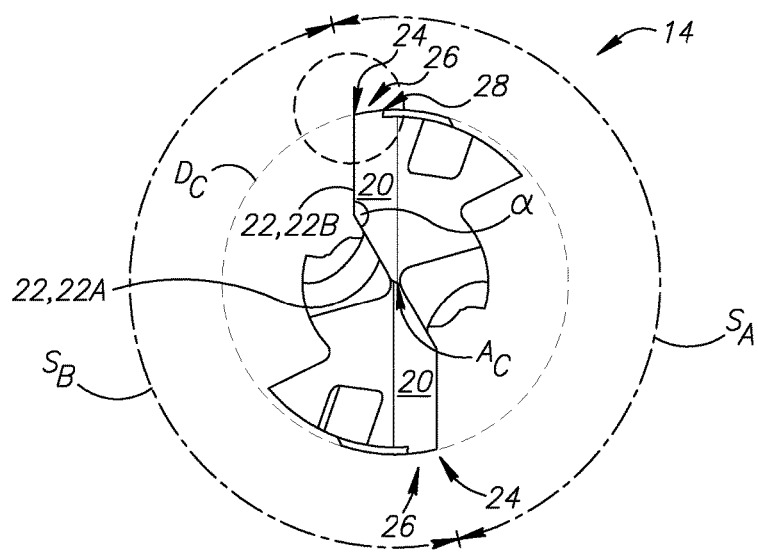
FIG. 4 is a front end view or top view of the drill head shown in FIG. 2A.

Reference is made to FIGS. 1A and 1B, illustrating a drill 10 according to the subject matter of the present application.

The drill 10 can comprise a drill body 12 and a drill head 14 configured to be mounted to the drill body 12. As shown, the drill head 14 is secured to the drill body 12 via rotational coupling of the drill head 14 on the drill body 12. Stated differently, the drill head 14 is removable from the drill body 12 and the drill 10 is devoid of all additional fastening means such as a screw for coupling the drill head 14 to the drill body 12.

The drill 10 is for metal cutting operations and the drill head 14 is typically made of extremely hard and wear-resistant material such as cemented carbide, either by form-pressing and then sintering carbide powders in a binder or by powder injection molding methods.

A central axis $A_C$, about which the drill 10 is configured to rotate in a rotation direction $D_R$, extends through the center of the drill body 12 and drill head 14 and can define a front-to-rear direction $D_{FR}$.

Referring now to FIGS. 2A to 2C, the drill head 14 comprises a plurality of cutting portions 16 located rearward of a chisel 17 of the drill head 14.

Each cutting portion 16 comprises a rake surface 18, a relief surface 20 and a cutting edge 22 formed at an intersection of the rake and relief surfaces 18, 20.

Referring also to FIG. 4, the cutting edge 22 can extend rearwardly from the chisel 17 to a cutting edge extremity 24 which defines a cutting diameter $D_C$. It will be understood from the drawings that use of the words "rearward" or "rearwardly" is not to be construed as strictly parallel with central axis $A_C$ in the front-to-rear direction $D_{FR}$.

The rake surface 16 is configured for chips (not shown) from a workpiece (not shown) to flow thereover.

In FIG. 2B a rake angle θ is shown, schematically, at the cutting edge extremity 24.

The relief surface 18 can form an internal acute angle β, shown schematically, with the rake surface 16 to provide relief during drilling.

In this non-limiting example, the cutting edge 22 can comprise two cutting edge portions. For example the cutting edge 22 can comprise a minor cutting edge portion 22A extending rearwardly from the chisel 17, and a major cutting edge portion 22B extending from the minor cutting edge portion 22A to the cutting edge extremity 24. The minor cutting edge portion 22A is also shown to extend radially, whereas the major cutting edge portion 22B can form an internal obtuse angle α therewith. In any case, the minor cutting edge portions 22A are preferably one third to one quarter of the length of the major cutting edge portions 22B.

The drill head 14 comprises a plurality of margins 26. The margins 26 are identical (as are the cutting portions 16) and therefore further reference will only be made to one of the margins 26.

Regarding rotational symmetry, with specific reference to FIG. 4, it is noted that each cutting edge extremity 24 and/or each margin 26 of the drill head are equally circumferentially spaced ($S_A = S_B$) about the central axis $A_C$, for reducing an imbalance of forces when the margins 26 abut an inner surface of a hole (not shown).

Figure 5A:
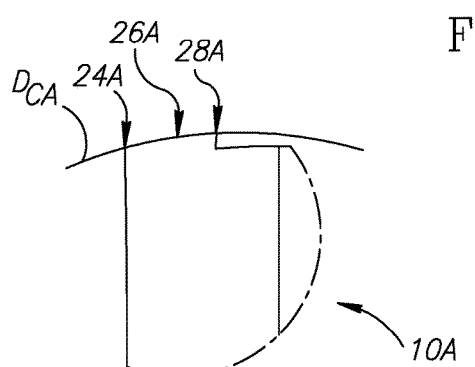
FIG. 5A is a schematic view of a prior art design, which could be found in a region of a prior art tool corresponding to the region encircled in FIG. 4.
Figure 5B:
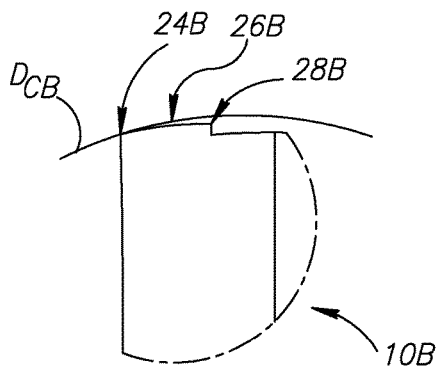
FIG. 5B is a schematic view of another prior art design, which could be found in a region of a prior art tool corresponding to the region encircled in FIG. 4.
Figure 5C:
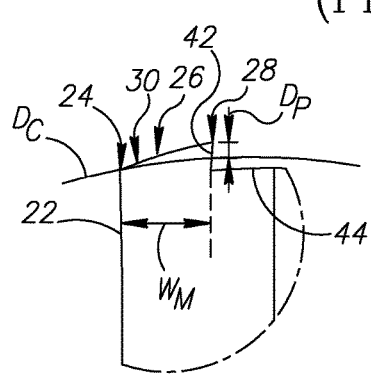
FIG. 5C is a schematic view of the region encircled in FIG. 4.

Referring also to FIGS. 4 and 5C, the margin 26, at least adjacent to the relief surface 20, comprises a margin extremity 28 located outside of the cutting diameter $D_C$ which constitutes a furthermost point of the margin 26 from the central axis $A_C$.

Drawing attention to FIGS. 5A and 5B, prior art constructions are shown for aiding understanding of the subject matter of the present application. Each prior art drill 10A, 10B comprises a cutting diameter $D_{CA}$, $D_{CB}$, a cutting edge extremity 24A, 24B, a margin 26A, 26B and a margin extremity 28A, 28B. The prior art drill 10A in FIG. 5A is designed for the margin 26A thereof to extend along the cutting diameter $D_{CA}$, and consequently the margin extremity 28A thereof also coincides with the cutting diameter $D_{CA}$. The prior art drill 10B in FIG. 5B is designed for the margin 26B thereof to extend within the cutting diameter $D_{CB}$, and consequently the margin extremity 28B thereof is located within the cutting diameter $D_{CB}$.

Referring only to FIG. 5C, the margin 26 can extend outside of the cutting diameter $D_C$ from beginning from a cutting edge extremity 24. To elaborate, at a point (schematically shown by the reference numeral "30") which is adjacent to the cutting extremity 24, the margin is already outside of the cutting diameter $D_C$.

The margin 26, particularly the margin extremity 28, can extend a protrusion distance $D_P$ of at least one micron (0.001 mm≤$D_P$) outside of the cutting diameter $D_C$.

Extensive testing has found that a larger protrusion distance $D_P$ range, at least for specific cutting diameters $D_C$, are preferred. To elaborate, recent testing has found that for drills with a cutting diameter $D_C$ of eight to nineteen millimeters (8 mm≤$D_C$≤19 mm), a superior performance was found with a protrusion distance $D_P$ of two to eight microns (0.002 mm≤$D_P$≤0.008 mm) outside of the cutting diameter $D_C$. Similarly, it was found that for drills with a cutting diameter $D_C$ of twenty to twenty five millimeters (20 mm≤$D_C$≤25 mm) have a superior performance with a protrusion distance $D_P$ of three to ten microns (0.003 mm≤$D_P$≤0.010 mm) outside of the cutting diameter $D_C$. It will be understood that drills of diameters smaller than eight millimeters and larger than twenty five millimeters can also be manufactured. Even though testing of further diameters has not yet been carried out, according to the principle of extrapolation based on the test results above, it is believed that drills with a cutting diameter $D_C$ of less than eight millimeters may have a preferred protrusion distance $D_P$ of one to six microns (0.001 mm≤$D_P$≤0.006 mm). Similarly, based on extrapolation, drills with a cutting diameter $D_C$ greater than twenty five millimeters may have a preferred protrusion distance $D_P$ of four to twelve microns (0.004 mm≤$D_P$≤0.012 mm). Accordingly, a preferred extrapolated range of protrusion distances $D_P$ would be one to twelve microns (0.001 mm≤$D_P$≤0.012 mm). Nonetheless, it is noted that a maximum upper limit of the protrusion distance $D_P$ at which this concept no longer works has not yet been found. Notwithstanding the above-said, it is also noted that a margin extremity extending outside of a cutting diameter by a protrusion distance $D_P$ of at least two microns ($D_P$≥0.002 mm) has found to have better performance than at least one micron ($D_P$≥0.001 mm). In any case, the successfully tested range, and hence most preferred tested range, is a protrusion distance $D_P$ of two to ten microns (0.002 mm≤$D_P$≤0.010 mm), with even more preferred diameter-specific ranges being those described above.

The margin 26 can have a convexly-curved shape (i.e. it continuously extends outside of the cutting diameter $D_C$ at a decreasing rate).

The margin extremity 28 can be located in a margin portion 32 of the margin 26.

Referring now to FIG. 3, the margin portion 32 extends between an upper limit 33 at an intersection of the relief surface 20 and the margin 26, to an imaginary lower limit 34 (located at an axial distance $D_A$ of 0.01 mm to 0.1 mm from the relief surface 20, or more precisely from the upper limit 33). It will be understood that due to the receding nature of the margin 26, as perhaps understood best from FIGS. 2C and 3, engagement of the drill head 14 and a hole being drilled (not shown) is only configured to extend to the imaginary lower limit 34. Stated differently, the margin portion 32 can be the only portion of the margin 26 configured to contact a hole (not shown), however it will be understood that due to tolerances additional portions of the margin 26 may contact the hole.

Accordingly, it will be understood that while the example shown has a preferred geometry, the entire margin 26 could be constituted entirely by the area shown as the margin portion 32. In such case, the cutting portion 16 could extend radially inwardly at axial positions lower than the margin portion 32 (not shown).

In any case, the margin 26 comprises a margin edge 36 extending along an intersection of the margin 26 and the rake surface 18. The margin 26, as shown in FIGS. 2C and 3, can be formed with a receding geometry.

At each cross section taken at axial positions which are not adjacent to the relief surface 20 (i.e. axially spaced from the relief surface 20; random axial positions are taken at the positions designated as 38 and 40 for exemplary purposes only) the margin 26 has a similar shape to the shape the margin portion 32, and as shown in FIGS. 3 and 5C.

The margin 26 extends from the margin edge 36 to the margin extremity 28. The margin extremity 28 can be located at an intersection of a flank surface 42 and the margin 26.

A margin width $W_M$ measured from the cutting edge extremity 24 to the flank surface 42 can be between 5% to 10% of the cutting diameter $D_C$ (0.05 $D_C$≤$W_M$≤0.10 $D_C$).

The flank surface 42 can extend inward to the drill head 14. In any case, as shown in FIG. 5C, the flank surface 42 extends from a position outside of the cutting diameter $D_C$ to a position within the cutting diameter $D_C$. Stated differently, the flank surface 42 is configured to provide a relief function (i.e. and can be considered a relief surface).

An outer diameter relief surface 44 can peripherally extend from the flank surface 42, in a direction away from the cutting edge extremity 24. The outer diameter relief surface 44 can be entirely located within the cutting diameter $D_C$.

The description above includes an exemplary embodiment and details, and does not exclude non-exemplified embodiments and details from the claim scope of the present application.

The invention claimed is:

1. A drill configured for drilling ductile materials, having a central axis $A_C$ defining a front-to-rear direction and comprising a drill body and a removable drill head;
the drill head being secured to the drill body via rotational coupling of the drill head on the drill body;
the drill head comprising:
a plurality of cutting portions;
each cutting portion comprising:
a rake surface;
a relief surface;
a cutting edge formed at an intersection of the rake and relief surfaces and extending rearwardly to a cutting edge extremity defining a cutting diameter of the drill head; and
a margin extending rearwardly from the relief surface and also extending from the rake surface;
each margin extends outside of the cutting diameter beginning from the cutting edge extremity;
each margin comprises a margin extremity adjacent to the relief surface and located outside of the cutting diameter;
the margin extremity is located at an intersection of a flank surface and the margin;
the flank surface extends inwardly from a position outside of the cutting diameter $(D_C)$ to a position within the cutting diameter $(D_C)$ to provide a relief function; and
an outer diameter relief surface extends peripherally from the flank surface, in a direction away from the cutting edge extremity, and is entirely located within the cutting diameter $(D_C)$.

2. The drill according to claim 1, wherein each cutting portion further comprises a margin edge extending along an intersection of each margin and the rake surface, and each margin, at each axial location along the margin edge, extends outside of the cutting diameter beginning from the margin edge.

3. The drill according to claim 2, wherein each margin continuously increases in distance from the cutting diameter until the margin extremity.

4. The drill according to claim 3, wherein the continuous increase in distance is at a decreasing rate.

5. The drill according to claim 2, wherein each margin, at each axial location, extends outside of the cutting diameter by a protrusion distance $(D_P)$ within the same range as the margin extremity.

6. The drill according to claim 1, wherein each margin extremity extends outside of the cutting diameter $(D_C)$ by a protrusion distance $(D_P)$ fulfilling the condition $0.001$ mm$\leq D_P \leq 0.012$ mm.

7. The drill according to claim 6, wherein each margin extremity extends outside of the cutting diameter $(D_C)$ by a protrusion distance $(D_P)$ of at least two microns, fulfilling the condition $0.002$ mm$\leq D_P \leq 0.012$ mm.

8. The drill according to claim 7, wherein each margin extremity extends outside of the cutting diameter $(D_C)$ by a protrusion distance $(D_P)$ of two to ten microns, fulfilling the condition $0.002$ mm$\leq D_P \leq 0.010$ mm.

9. The drill according to claim 1, wherein either:
(a) the cutting diameter $(D_C)$ is less than eight millimeters $(D_C < 8$ mm$)$, and each margin extremity extends outside of the cutting diameter $(D_C)$ by a protrusion distance $(D_P)$ of one to six microns $(0.001$ mm$\leq D_P \leq 0.006$ mm$)$; or
(b) the cutting diameter $(D_C)$ is eight to nineteen millimeters $(8$ mm$\leq D_C \leq 19$ mm$)$, and each margin extremity extends outside of the cutting diameter $(D_C)$ by a protrusion distance $(D_P)$ of two to eight microns $(0.002$ mm$\leq D_P \leq 0.008$ mm$)$; or
(c) the cutting diameter $(D_C)$ is twenty to twenty-five millimeters $(20$ mm$\leq D_C \leq 25$ mm$)$, and each margin extremity extends outside of the cutting diameter $(D_C)$ by a protrusion distance $(D_P)$ of three to ten microns $(0.003$ mm$\leq D_P \leq 0.010$ mm$)$; or
(d) the cutting diameter $(D_C)$ is greater than twenty-five millimeters $(D_C > 25$ mm$)$, and each margin extremity extends outside of the cutting diameter $(D_C)$ by a protrusion distance $(D_P)$ of four to twelve microns $(0.004$ mm$\leq D_P \leq 0.012$ mm$)$.

10. The drill according to claim 1, wherein each margin extends an axial distance no greater than 0.1 mm from the relief surface.

11. The drill according to claim 1, wherein each margin comprises a margin portion which is the only portion of the margin comprising an extremity located outside of the cutting diameter, the margin portion extending an axial distance no greater than 0.1 mm from the relief surface.

12. The drill according to claim 1, wherein each cutting edge extremity is equally circumferentially spaced about the central axis $(A_C)$.

13. The drill according to claim 1, wherein the cutting edge has a rake angle $(\theta)$, at the cutting edge extremity, of twenty to thirty degrees, fulfilling the condition: $20° \leq \theta \leq 30°$.

14. The drill according to claim 1, wherein a margin width $(W_M)$ measured from the cutting edge extremity to the flank surface is between 5% to 10% of the cutting diameter $(D_C)$ fulfilling the condition $0.05$ $D_C \leq W_M \leq 0.10$ $D_C$.

15. The drill according to claim 1, wherein:
each of the cutting edges comprises a minor cutting edge portion and major cutting edge portion extending from the minor cutting edge portion; and
the minor cutting edge portions are one third to one quarter of the length of the major cutting edge portions.

16. The drill according to claim 1, wherein the margin is formed with a receding geometry.

* * * * *